US012356272B2

(12) United States Patent
Sevindik

(10) Patent No.: US 12,356,272 B2
(45) Date of Patent: Jul. 8, 2025

(54) SIGNAL REPEATER TO CAUSE A HANDOFF IN A WIRELESS NETWORK

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 736 days.

(21) Appl. No.: 17/565,781

(22) Filed: Dec. 30, 2021

(65) Prior Publication Data

US 2023/0217340 A1 Jul. 6, 2023

(51) Int. Cl.
*H04W 36/32* (2009.01)
*H04W 36/08* (2009.01)
*H04W 36/30* (2009.01)
H04W 36/18 (2009.01)
H04W 84/04 (2009.01)

(52) U.S. Cl.
CPC .......... *H04W 36/32* (2013.01); *H04W 36/08* (2013.01); *H04W 36/30* (2013.01); *H04W 36/18* (2013.01); *H04W 84/047* (2013.01)

(58) Field of Classification Search
CPC .......... H04W 36/00835; H04W 16/14; H04W 36/0058; H04W 36/0061; H04W 24/10; H04W 36/08; H04W 36/00837
See application file for complete search history.

(56) References Cited

U.S. PATENT DOCUMENTS

| | | | | |
|---|---|---|---|---|
| 2017/0156093 A1* | 6/2017 | Bhumkar | .......... | H04W 36/0011 |
| 2021/0306925 A1* | 9/2021 | Khan | .................. | H04W 52/362 |
| 2022/0104097 A1* | 3/2022 | Hu | ...................... | H04W 12/122 |
| 2022/0286926 A1* | 9/2022 | England | ................ | H04W 40/36 |

* cited by examiner

*Primary Examiner* — Nam T Huynh
(74) *Attorney, Agent, or Firm* — Armis IP Law, LLC

(57) ABSTRACT

A first wireless base station provides a communication device access to a remote network over a wireless communication link. The wireless communication link provides poor connectivity between the mobile communication device and the first wireless base station. The first wireless base station receives a notification indicating that the communication device is within wireless range of at least a second wireless base station. To initiate a handoff of the communication device from the first wireless base station to the second wireless base station, the first wireless base station transmits a wireless signal encoded to indicate that the wireless signal was transmitted from the second wireless base station. Communication of the wireless signal causes the communication device to perceive that it receives a strong signal from the second wireless base station, prompting the communication device to perform a handoff from the first wireless base station to the second wireless base station.

29 Claims, 10 Drawing Sheets

| REC'D SIGNAL | PWR LEVEL | CELL IDENTIFIER |
|---|---|---|
| 161 | 10 | PCI100 |
| 162 | 12 | PCI200 |
| 163 | 8 | PCI300 |
| 164 | 2 | PCI400 |
| 165 | 3 | PCI500 |
| 166 | 7 | PCI600 |
| ... | | |

SIGNAL REPEATER TO CAUSE A HANDOFF IN A WIRELESS NETWORK

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels are allocated to a base station by a SAS (Spectrum Access System) to support communications with one or more mobile communication devices or so-called customer premises equipment. For example, a base station can be configured to communicate with the SAS to receive notification of one or more wireless channels allocated for its use.

Subsequent to registration and wireless channel allocation, the wireless base station communicates so-called heartbeat request messages to the spectrum access system in order to continue use of the allocated one or more wireless channels. For example, the customer premises equipment (such as wireless station or CBSD) is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on a request from the CBSD; the spectrum allocation/grant to the CBSD can be in a chunks of 10 MHz or 20 MHz and up to 100 MHz assuming LTE operation.

Conventional communication systems include cellular networks. For example, certain cellular networks include multiple wireless base station supporting so-called cells (such as regions of wireless coverage). In certain instances, each cell is assigned a unique identity such as a Physical Cell ID (a.k.a., PCI), which is used to distinguish one cell from another. The physical cell identity can be used for cell identification in the physical layer and channel synchronization.

As an example implementation, a first wireless base station is assigned a first physical cell identity, a second wireless base station is assigned a second physical cell identity, and so on. Each respective wireless base station wirelessly communicates its assigned physical cell identity in the network environment such that listening mobile communication devices are able to determine presence of the different cells and corresponding wireless base stations.

A conventional PCI (physical cell identity) value is created from two components—namely, (PSS) Primary Synchronization Signal and (SSS) Secondary Synchronization Signal transmitted from a wireless base station. The wireless base station transmits these signals to indicate its physical cell identity. A mobile communication device (such as user equipment) receives the signals from a transmitting wireless base station. After successful decode of PSS and SSS, the UE is then able to calculate its PCI using known techniques.

BRIEF DESCRIPTION OF EMBODIMENTS

Embodiments herein provide novel ways of providing improved wireless communications to one or more communication devices in a network environment.

More specifically, in one embodiment, a wireless network environment includes multiple wireless base stations such as a first wireless base station, second wireless base station, etc. The first wireless base station provides a communication device access to a remote network over a wireless communication link. Assume that the wireless communication link provides poor connectivity (such as low quality communications) between the mobile communication device and the first wireless base station. The first wireless base station receives a notification indicating that the communication device is within wireless range of at least a second wireless base station. To initiate a handoff of the communication device from the first wireless base station to the second wireless base station, the first wireless base station transmits a wireless signal encoded to indicate that the wireless signal was transmitted from the second wireless base station. Communication of the wireless signal from the first wireless base station prompts the mobile communication device to initiate a respective handoff from the first wireless base station to the second wireless base station.

In one embodiment, communication of the wireless signal from the first wireless base station causes the communication device to perceive that it receives a strong signal from the second wireless base station (such as combination of a signal from the second wireless base station and a signal from the first wireless base station), prompting the communication device to select the second wireless base station and perform a handoff of the wireless communication link from the first wireless base station to the second wireless base station. Thus, the wireless signal transmitted from the first wireless base station causes the communication device to handoff from the first wireless base station to the second wireless base station.

In further example embodiments, the first wireless base station can be configured to generate the wireless signal for any reason. For example, in one embodiment, the first wireless base station transmits the wireless signal in response to detecting that a quality of the first wireless communication link falls below a threshold level and the first wireless base station desires that the mobile communication device handoff to the second wireless base station.

The first wireless base station can be configured to receive the notification that the communication device is within wireless range of the second wireless base station. For example, in one embodiment, the first wireless base station receives the notification from the communication device. The communication device generates the notification that the communication device is within wireless range of the first wireless base station based at least in part in response to detecting that the second wireless base station is within wireless range of the communication device.

In still further example embodiments, the first wireless base station implements one or more instances of antenna hardware to transmit the wireless signal from the first wireless base station using a unique identity assigned to the second wireless base station. For example, in one embodiment, the wireless signal from the first wireless base station replicates a wireless communication transmitted by the second wireless base station. The mobile communication device perceives that the wireless signal from the first wireless base station is received from the second wireless base station because the transmitted communication from the first wireless base station includes information indicating that it was transmitted from the second wireless base station even that was transmitted from the first wireless base station.

In yet further example embodiments, the first wireless base station receives notice of the unique identity (such as a physical cell identity value or other suitable information) associated with the second wireless base station from any suitable resource. In one embodiment, the first wireless base station receives notification of the unique identity assigned to the second wireless base station based on a communication (such as communication information) received from the communication device.

In one embodiment, the wireless signal from the first wireless base station is a replica of a wireless communication transmitted by the second wireless base station.

Still further example embodiments herein include, at the first wireless base station, receiving feedback from the communication device. The feedback from the communication device indicates a unique identity of the second wireless base station and a power level at which the communication device receives a communication from the second wireless base station. The feedback received from the communication device further includes a unique identity of a third wireless base station and a power level at which the communication device receives a communication from the third wireless base station. The first wireless base station selects the unique identity of the second wireless base station in which to transmit the wireless signal from the first wireless base station in response to detecting that the power level at which the communication device receives the communication from the second wireless base station is greater than the power level at which the communication device receives a communication from the second wireless base station. In other words, the second wireless base station is a better candidate in which to receive a handoff of the communication device from the first wireless base station than the third wireless base station because the second wireless base station provides better wireless connectivity quality than the third wireless base station.

Further embodiments herein include:

1. A first wireless base station such as a CBSD1 (e.g., wireless base station, wireless access point, etc.) that powers ON and connects with a respective spectrum access system for allocation of one or more wireless channels.

2. The spectrum access system grants spectrum (multiple wireless channels) to the first wireless base station such as CBSD1.

3. UEs (multiple instances of user equipment or mobile communication devices) connect to the first wireless base station and start sending data in a respective uplink to the first wireless base station and receive data from the first wireless base station in the downlink.

4. The first wireless base station determines that one or more instances of the user equipment reside on a cell edge based on the power headroom information (such as information specifying power levels at which the respective user equipment receives wireless signals from other wireless stations in the network environment) reported by the UEs to the first wireless base station.

In one embodiment, if powerheadroom=[0,N]; the respective UE is near an edge of the region of wireless coverage provided by the first wireless base station. Any suitable method can be used to determine whether the respective communication devices on the cell edge. For example, the power level of a received signal from the mobile communication device at the wireless base station indicates that the communication device resides on a cell edge of the wireless base station. The mobile communication device can communicate its location to the wireless base station. Via the location information from the communication device, the wireless base station is aware that the communication device is located on a respective cell edge.

5. The first wireless base station requests a report from any instances of the user equipment near an edge of the region of wireless coverage provided by the first wireless base station. In one embodiment, the UEs at the cell edge associated with the first wireless base station reports information such as PCIs (Physical Cell Identities) associated with other wireless base stations detected by the respective user equipment. In one embodiment, these are the PCIs of the other nearby candidate wireless base stations (such as CBSDs) transmitting in the network environment. The candidate wireless base stations may support a respective handoff.

6. The first wireless base station asks non-cell edge UEs to report the PCIs that they detect from other nearby wireless base stations transmitting their physical cell identities.

7. The first wireless base station finds the PCIs that can be measured by UEs on a respective cell edge, but cannot be seen and measured by the non-cell edge UEs. These are the PCIs that can reach to the cell edge of the first wireless base station attempting to handoff the communication device; however, wireless power of these transmitted PCIs may not be of sufficient level to be detected by the first wireless base station. The power level of the transmitted PCIs may not be sufficiently strong to cause the communication device to initiate the handoff to any of those wireless base stations.

8. In further example embodiments, the first wireless base station uses one of the cell edge only PCIs in a repeater mode (such as dedicated antenna hardware) in which the first wireless base station transmits a respective signal indicating the physical cell identity of another wireless base station detected by the user equipment. In one embodiment, the first wireless base station enters a repeater mode as follows:

the first wireless base station selects a physical cell identity of a wireless base station in communication with the user equipment on the edge of the region of wireless coverage provided by the first wireless base station, the first wireless base station dedicates 2 of its antennas (antenna hardware) for repeater operation to transmit the selected physical cell identity, the first wireless base station transmits the selected physical cell identity in 360-degree direction; the communication device perceives that the second wireless base station transmits the cell identity even though it is transmitted from the first wireless base station. In further example embodiments, the first wireless base station starts counting the number of UEs that are handing off to the wireless base station assigned the selected physical cell identity. These UEs are probably handing off from the first wireless base station as original owner of the PCI.

If the number of mobile UEs getting connected to the repeated PCI is greater than a threshold level or threshold number 'N', then the first wireless base station will keep transmitting the selected PCI associated with the second wireless base station. This causes one or more communication devices to handoff from the first wireless base station to the second wireless base station. If not, then the first wireless base station will select another physical cell identity to transmit. The first wireless base station repeats this process as needed. In this manner, the first wireless base station is able to initiate a handoff of one or more mobile communication devices to the second wireless base station via transmission of identity information associated with the second wireless base station. When the first wireless base station transmits a respective physical cell identity information of a third wireless base station, this prompts one or more communication devices to handoff from the first wireless base station to the third wireless base station. Thus, via the transmission of cell identity information as described herein, the first wireless base station is able to initiate a handoff of one or more mobile communication devices to other wireless base stations.

Embodiments herein are useful over conventional techniques. For example, embodiments herein include unique ways of facilitating one or more handoffs in a wireless network environment.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: provide a communication device access to a remote network over a first wireless communication link; receive a notification indicating that the communication device is within wireless range of a second wireless base station; and transmit a wireless signal from the first wireless base station, the wireless signal from the first wireless base station encoded to indicate that the wireless signal was transmitted from the second wireless base station.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating generation of wireless performance information associated with multiple candidate wireless base stations according to embodiments herein.

Figure 1:
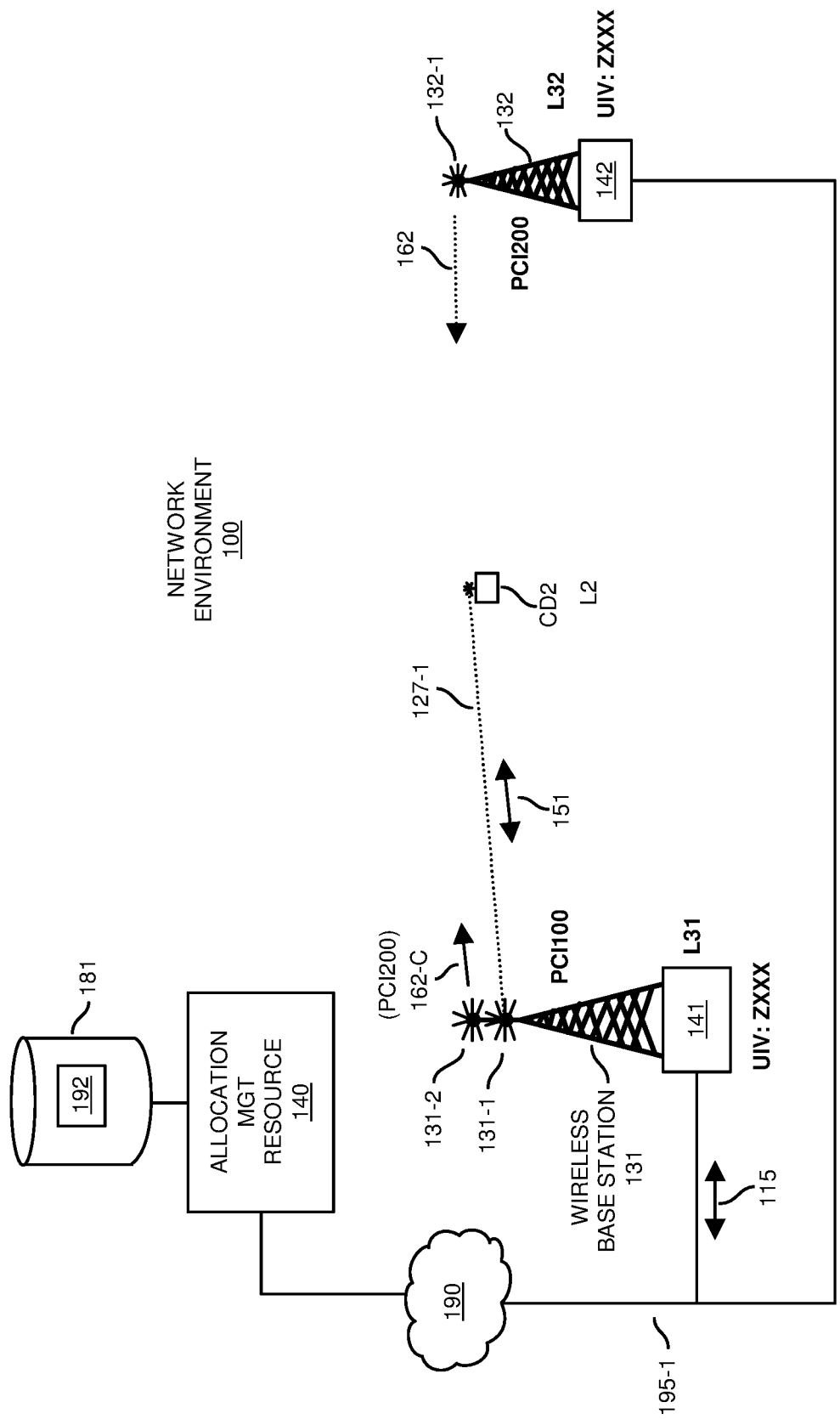
FIG. 1 is an example diagram illustrating a communication network environment and multiple wireless base stations supporting handoff control according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless network environment includes multiple wireless base stations such as a first wireless base station, a second wireless base station, etc. The first wireless base station provides a communication device access to a remote network over a wireless communication link. Assume that the wireless communication link provides poor connectivity between the mobile communication device and the first wireless base station. Assume also that the first wireless base station receives a notification indicating that the communication device is within wireless range of at least a second wireless base station. To initiate a handoff of the communication device from the first wireless base station to the second wireless base station, the first wireless base station transmits a wireless signal encoded to indicate that the wireless signal was transmitted from the second wireless base station.

As further discussed herein, reception of the wireless signal from the first wireless base station and wireless signal from the second wireless base station at the communication device CD2 causes the communication device to perceive that it receives a strong signal from the second wireless base station (such as combination of a signal from the second wireless base station and a signal from the first wireless base station). This prompts the communication device to perform a handoff of the communication device from the first wireless base station to the second wireless base station.

Now, more specifically, with reference to the drawings, FIG. 1 is an example diagram illustrating a communication network environment and multiple wireless base stations supporting handoff control according to embodiments herein.

As shown, network environment 100 includes allocation management resource 140 (such as spectrum access system), repository 181, wireless base station 131, wireless base station 132, etc., one or more communication devices such as including communication device CD2.

Each of the wireless base stations includes respective one or more instances of antenna hardware to wirelessly communicate with mobile communication devices (a.k.a., user equipment). For example, in this embodiment, the wireless base station 131 includes antenna hardware 131-1, antenna hardware 131-2, etc. Wireless base station 132 includes antenna hardware 132-1. Each of the wireless base stations includes one or more instances of antenna hardware.

Note that each of the resources in network environment 100 can be configured to include or be configured as appropriate hardware, software, or combination of hardware and software to carry out respective operations as discussed herein.

More specifically, the wireless base station 131 as described herein can be implemented via respective wireless base station hardware, wireless base station software, or a combination of wireless base station hardware and wireless base station software; communication management resource 141 associated with wireless base station 131 can be implemented via communication management hardware, communication management software, or a combination of communication management hardware and communication management software; wireless base station 132 as described herein can be implemented via respective wireless base station hardware, wireless base station software, or a combination of wireless base station hardware and wireless base station software; communication management resource 142 associated with wireless base station 132 can be implemented via communication management hardware, communication management software, or a combination of communication management hardware and communication management software; allocation management resource 140 can be implemented via allocation management hardware, allocation management software, or allocation management hardware and allocation management software; and so on.

As further shown in this example embodiment, the link 195-1 (such as shared communication link, cable, physical link, wireless link, etc.) provides connectivity between the wireless base station 131 and the remote network 190; the link 195-1 (such as shared communication link, cable, physical link, wireless link, etc.) provides connectivity between the wireless base station 132 and the remote network 190; and so on.

As previously discussed, the wireless base station 131 includes communication management resource 141. Communication management resource 141 (such as circuitry, multiple semiconductor chips, processors, drivers, logic, etc.) controls transmission and reception of wireless communications from/to the antenna hardware antenna hardware 131-1, 131-2, etc., of wireless base station 131. Communication management resource 142 (such as circuitry, multiple semiconductor chips, logic, etc.) controls transmission and reception of wireless communications from/to the antenna hardware 132-1 of the wireless base station 132.

Each of the wireless base stations in network environment 100 can be configured to support any suitable wireless communication protocol. For example, embodiments herein support cellular communications, 5G NR, Wi-Fi™, etc.

In one embodiment, each of the instances of antenna hardware associated with the wireless base station 131 and wireless base station 132 can be configured to support wireless beamforming. For example, the antenna hardware 131-1, 131-2, etc., includes any number of antenna elements to support wireless beamforming in any suitable direction with respect to the wireless base station 131. Additionally, the antenna hardware 132-1 includes any number of antenna elements to support wireless beamforming in any suitable direction.

Additionally, or alternatively, the antenna hardware 131-1, 131-2, etc., supports omni-directional wireless communications.

As shown in FIG. 1, each of the wireless base station 131 and wireless base station 132 registers with the allocation management resource 140 for use of one or more wireless channels. In one embodiment, the allocation management resource 140 is a so-called spectrum access system that allocates wireless channels from the CBRS (Citizen Band Radio Service) band. In one embodiment, the wireless base station 131 is a first CBSD (Citizen Broadband radio Service Device); the wireless base station 132 is a second CBSD (Citizen Broadband radio Service Device).

In one embodiment, the allocation management resource 140 produces allocation management information 192 stored in repository 181. The allocation management information 192 keeps track of the different wireless channels allocated to the wireless base stations in the network environment 100.

Further in this example embodiment, the first wireless base station 131 provides the communication device CD2 access to a remote network 190 via wireless communication link 127-1. For example, the communication device CD2 establishes a respective wireless communication link 127-1 with the wireless base station 131 and corresponding communication management resource 141. The wireless communication link 127-1 supports conveyance of wireless communications 151 between the wireless base station 131 and the mobile communication device CD2.

In one embodiment, the wireless communications support conveyance of data in a downlink direction from the wireless base station 131 to the mobile communication device CD2 and conveyance of data in an uplink direction from the communication device CD2 to the wireless base station 131.

Assume further in this example embodiment that the wireless communication link 127-1 provides poor connectivity (such as low bandwidth data rate, loss of bit information, etc., below a respective threshold level) between the mobile communication device CD2 and the wireless base station 131.

In one embodiment, the wireless base station 131 receives a notification indicating that the communication device CD2 is within wireless range of at least wireless base station 132. The second wireless base station 132 communicates wireless communications 162 to the communication device CD2. In further example embodiments, the wireless communications 162 provide notification of cell identity information (such as PCI200) to the mobile communication device CD2. The wireless base station 132 or other suitable entity communicates notification of the cell identity (such as PCI200 or other suitable information) associated with wireless base station 132 to the wireless base station 131.

In one embodiment, in response to detecting the poor wireless connectivity via the wireless communication link 127-1, the wireless base station 131 or other suitable entity elects to initiate a handoff of the communication device CD2 from the first wireless base station 131 to the second wireless base station 132.

To force or encourage the handoff, in a repeater mode, the first wireless base station 131 transmits wireless signal 162-R from the antenna hardware 131-2 to the communication device CD2. The wireless signal 162-C is encoded to indicate that the wireless signal 162-C appears to be transmitted from the second wireless base station 132 to the communication device CD2.

Communication of the wireless signal 162-R from the first wireless base station 131 (and communication of the wireless signal 162 from the wireless base station 132) causes the communication device CD2 to perceive that it receives a strong signal from the second wireless base station 132 (such as combination of a signal 162 from the second wireless base station 132 and a signal 162-R from the first wireless base station 131), prompting the communication device CD2 to select the second wireless base station 132 and perform a handoff from the first wireless base station 131 to the second wireless base station 132. Thus, the wireless signal 162-C transmitted from the first wireless base station 131 causes tor at least prompts he communication device CD2 to handoff from the first wireless base station 131 to the second wireless base station 132.

Figure 2:
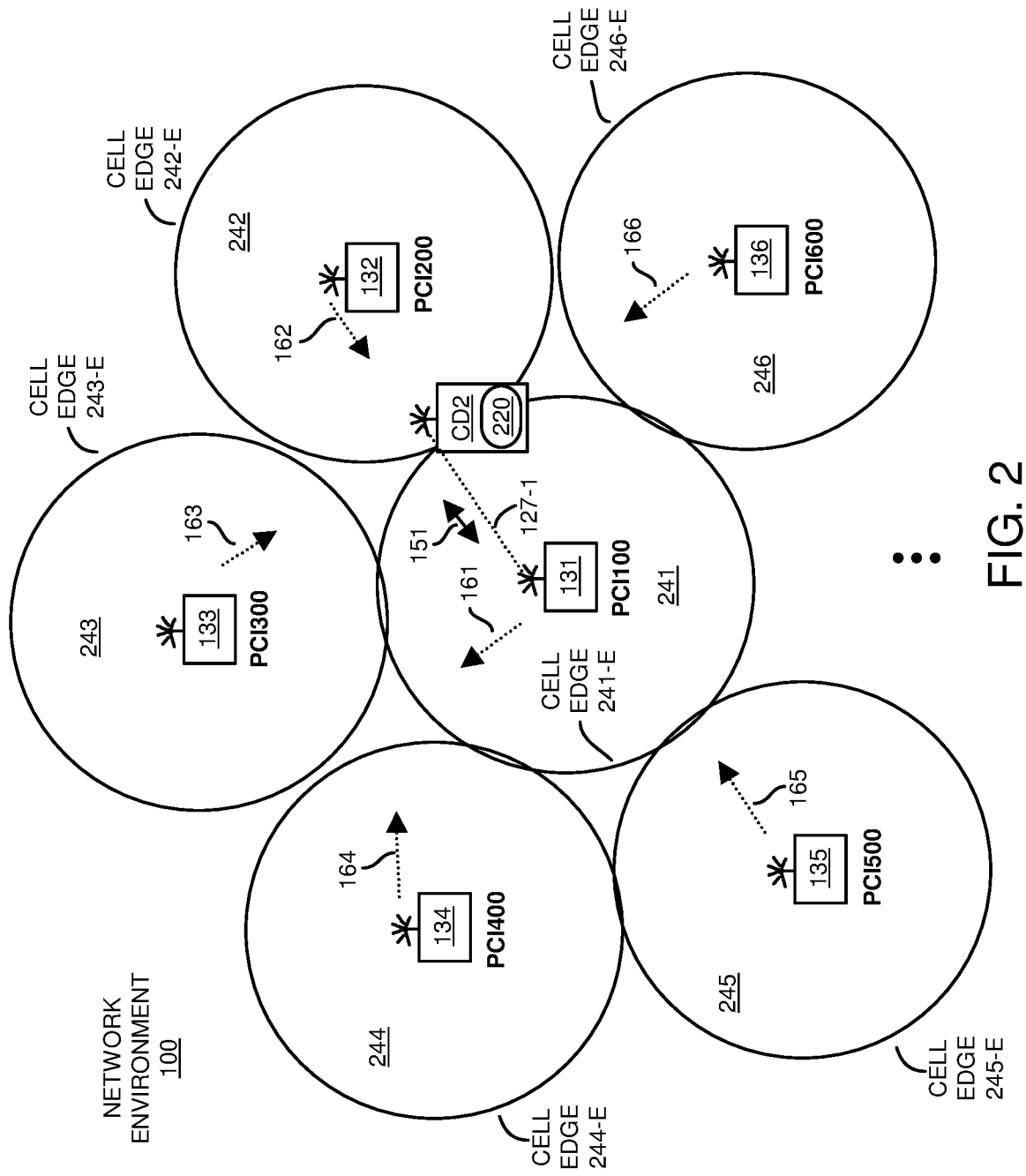
FIG. 2 is an example diagram illustrating a mobile communication device disposed on a cell edge and monitoring availability of wireless base stations according to embodiments herein.

FIG. 2 is an example diagram illustrating a mobile communication device disposed on a cell edge and monitoring availability of wireless base stations according to embodiments herein.

As shown in this example embodiment, the wireless network environment includes multiple wireless base stations including wireless base station 131, wireless base station 132, wireless base station 133, wireless base station 134, wireless base station 135, wireless base station 136, etc.

Each of the wireless base stations in the network environment 100 is assigned a different unique identifier value. For example, wireless base station 131 is assigned unique identifier value PCI100; wireless base station 132 is assigned unique identifier value PCI200; wireless base station 133 is assigned unique identifier value PCI300; wireless base station 134 is assigned unique identifier value PCI400; wireless base station 135 is assigned unique identifier value PCI500; wireless base station 136 is assigned unique identifier value PCI600; and so on.

Wireless base station 131 transmits at a sufficiently high wireless power level to provide wireless connectivity to corresponding mobile communication devices disposed in the region of wireless coverage 241. The outermost limit of the region of wireless coverage 241 represents a respective cell edge 241-E. In this example embodiment, the wireless base station 131 transmits notification of its identity (PCI100 such as its physical cell identity) via wireless communications 161. In one embodiment, the broadcast of wireless communications 161 is omni-directional.

Wireless base station 132 transmits at a sufficiently high wireless power level to provide wireless connectivity to corresponding mobile communication devices disposed in the region of wireless coverage 242. The outermost limit of the region of wireless coverage 242 represents a respective cell edge 242-E. In this example embodiment, the wireless base station 132 transmits notification of its identity (PCI200 such as its physical cell identity) via wireless communications 162. In one embodiment, the broadcast of wireless communications 162 is omni-directional.

Wireless base station 133 transmits at a sufficiently high wireless power level to provide wireless connectivity to corresponding mobile communication devices disposed in the region of wireless coverage 243. The outermost limit of the region of wireless coverage 243 represents a respective cell edge 243-E. In this example embodiment, the wireless base station 133 transmits notification of its identity (PCI300 such as its physical cell identity) via wireless communications 163. In one embodiment, the broadcast of wireless communications 163 is omni-directional.

Wireless base station 134 transmits at a sufficiently high wireless power level to provide wireless connectivity to corresponding mobile communication devices disposed in the region of wireless coverage 244. The outermost limit of the region of wireless coverage 244 represents a respective cell edge 244-E. In this example embodiment, the wireless base station 134 transmits notification of its identity (PCI400 such as its physical cell identity) via wireless communications 164. In one embodiment, the broadcast of wireless communications 164 is omni-directional.

Wireless base station 135 transmits at a sufficiently high wireless power level to provide wireless connectivity to corresponding mobile communication devices disposed in the region of wireless coverage 245. The outermost limit of the region of wireless coverage 245 represents a respective cell edge 245-E. In this example embodiment, the wireless base station 135 transmits notification of its identity (PCI500 such as its physical cell identity) via wireless communications 165. In one embodiment, the broadcast of wireless communications 165 is omni-directional.

Wireless base station 136 transmits at a sufficiently high wireless power level to provide wireless connectivity to corresponding mobile communication devices disposed in the region of wireless coverage 246. The outermost limit of the region of wireless coverage 246 represents a respective cell edge 246-E. In this example embodiment, the wireless base station 136 transmits notification of its identity (PCI600 such as its physical cell identity) via wireless communications 166. In one embodiment, the broadcast of wireless communications 166 is omni-directional.

In further example embodiments, the communication device CD2 monitors the wireless network environment 100 for cell identity communications transmitted by each of the wireless base stations. As a result of the monitoring, the communication device CD2 receives wireless communications 161 from the wireless base station 131; the communication device CD2 receives wireless communications 162 from the wireless base station 132; the communication device CD2 receives wireless communications 163 from the wireless base station 133; the communication device CD2 receives wireless communications 164 from the wireless base station 134; the communication device CD2 receives wireless communications 165 from the wireless base station 135; the communication device CD2 receives wireless communications 166 from the wireless base station 136; and so on.

In one embodiment, the communication device CD2 resides at a respective cell edge 241-E of the region of wireless coverage 241. Because the communication device CD2 is located so far away from the wireless base station 131, the corresponding wireless communication link 127-1 provides poor quality (such as a low data rate, lost bits, low wireless power level of signals to the communication device CD2, etc.) of conveying wireless communications 151 between the wireless base station 131 and the communication device CD2.

Further in this example embodiment, the communication device CD2 monitors a respective power level of received the communications from the wireless base stations in the network environment 100. For example, the communication device CD2 monitors a wireless power level of receiving wireless communications 161 (such as including physical cell identity information PCI100) received from the wireless base station 131; the communication device CD2 monitors a wireless power level of receiving wireless communications 162 (including physical cell identity information PCI200) received from the wireless base station 132; the communication device CD2 monitors a wireless power level of receiving wireless communications 163 (such as including physical cell identity information PCI300) received from the wireless base station 133; the communication device CD2 monitors a wireless power level of receiving wireless communications 164 (including physical cell identity information PCI400) received from the wireless base station 134; the communication device CD2 monitors a wireless power level of receiving wireless communications 165 (such as including physical cell identity information PCI500) received from the wireless base station 135; the communication device CD2 monitors a wireless power level of receiving wireless communications 166 (including physical cell identity information PCI600) received from the wireless base station 136; and so on.

In further example embodiments, the communication device CD2 or other suitable entity produces the communication information 220 as shown in FIG. 3. The communication information 220 includes information such as an identity of the wireless base station from which respective cell identity is received.

FIG. 3 is an example diagram illustrating generation of wireless performance information associated with multiple candidate wireless base stations according to embodiments herein.

In this example embodiment, the communication device CD2 receives the wireless communications 161 including PCI100 at a power level of 10. In such an instance, the communication device CD2 produces the communication information 220 to indicate that the communication device CD2 receives the wireless signal 161 including the physical cell identity information at a power level of 10. Assume in this embodiment that a higher magnitude of power level indicates a higher wireless power; the lower power level indicates a lower magnitude of wireless power.

The communication device CD2 receives the wireless communications 162 including PCI200 at a power level of 12. In such an instance, the communication device CD2 produces the communication information 220 to indicate that the communication device CD2 receives the wireless signal 162 including the physical cell identity information at a power level of 12.

The communication device CD2 receives the wireless communications 163 including PCI300 at a power level of 8. In such an instance, the communication device CD2 produces the communication information 220 to indicate that the communication device CD2 receives the wireless signal 163 including the physical cell identity information at a power level of 8.

The communication device CD2 receives the wireless communications 164 including PCI400 at a power level of 2. In such an instance, the communication device CD2 produces the communication information 220 to indicate that the communication device CD2 receives the wireless signal 164 including the physical cell identity information at a power level of 2.

The communication device CD2 receives the wireless communications 165 including PCI500 at a power level of 3. In such an instance, the communication device CD2 produces the communication information 220 to indicate that the communication device CD2 receives the wireless signal 165 including the physical cell identity information at a power level of 3, and so on.

Figure 4:
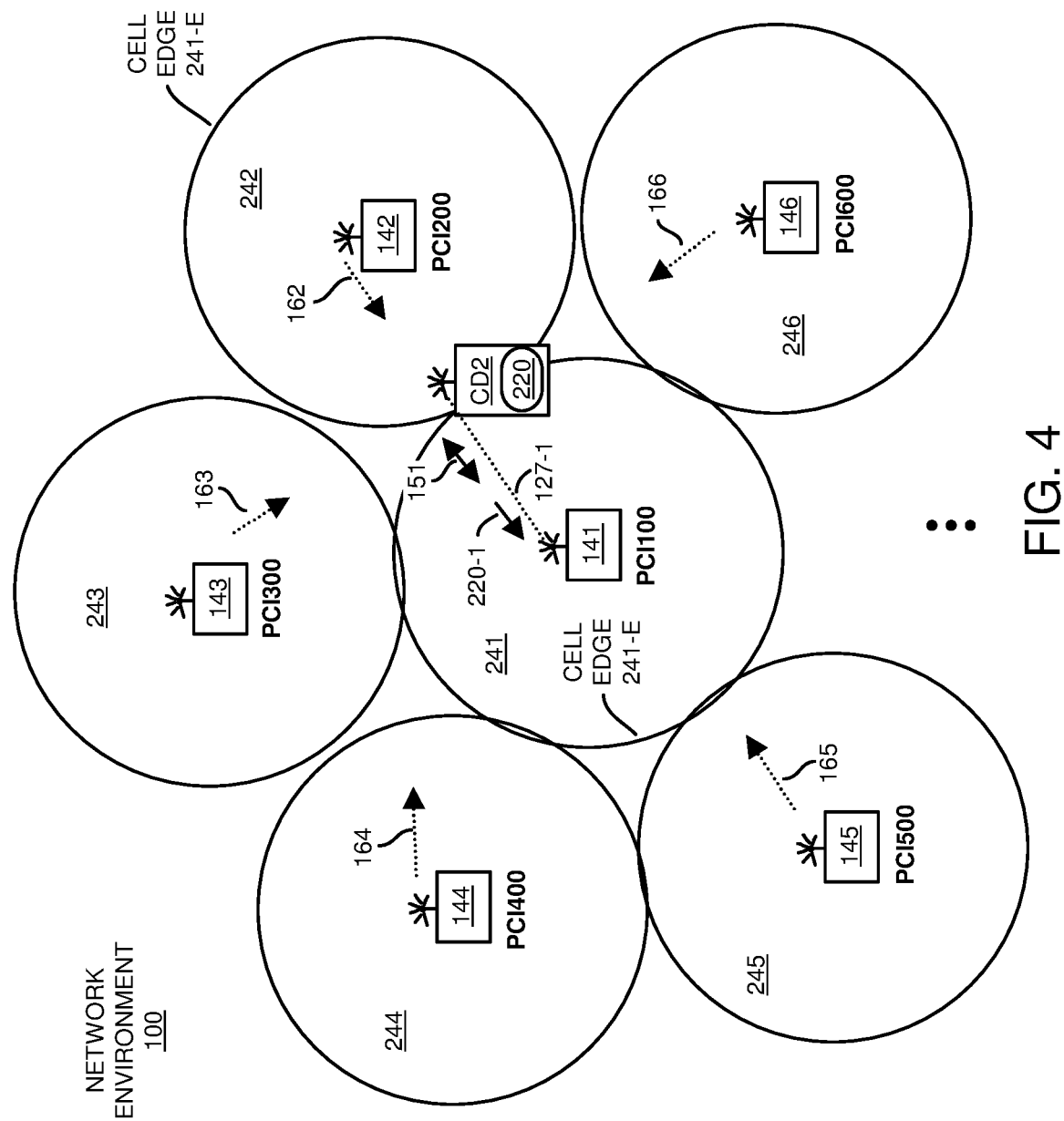
FIG. 4 is an example diagram illustrating conveyance of wireless performance information from a mobile communication device to a wireless base station according to embodiments herein.

FIG. 4 is an example diagram illustrating conveyance of wireless performance information from a mobile communication device to a wireless base station according to embodiments herein.

As further shown, subsequent to monitoring identities of the wireless base stations, the communication device CD2 transmits the communication information 220 over the respective wireless communication link 127-1 to the wireless base station 131 via wireless communications 220-1.

Via receipt of the communication information 220 from the communication device CD2, the wireless base station 131 receives notification that the communication device CD2 is within wireless range of the wireless base stations 132, 133, 134, 135, etc. Thus, in one embodiment, the communication device CD2 generates a notification that the communication device is within wireless range of the wireless base station 132 and other wireless base station based at least in part in response to the communication device CD2 detecting that the other wireless base station are within wireless range of the communication device CD2.

In one embodiment, the communication information 220 is feedback received from the communication device CD2. The communication information 220 (such as feedback, notification, etc.) indicates a unique identity PCI200 of the second wireless base station 132 and a power level 12 at which the communication device CD2 receives the wireless signal 162 from the wireless base station 132. The communication information 220 received from the communication device CD2 further includes a unique identity of wireless base station 133 and a power level 8 at which the communication device receives a communication from the third wireless base station 133.

As previously discussed, assume in this example embodiment, that the higher the number in the power level, the greater the magnitude of the received wireless signal.

In still further example embodiments, assume that the wireless base station 131 detects that the link quality associated with the wireless communication link 127-1 is poor such as below a respective threshold level. In such an instance, the wireless base station 131 wishes to encourage a respective handoff of the communication device CD2 and wireless communication link 127-1 to another wireless base station in the network environment 100.

In one embodiment, the wireless base station 131 reviews the list of candidate wireless base stations as indicated by the communication information 220 to determine which of the wireless base stations will be able to provide a good quality communication link with the communication device CD2. For example, the wireless base station 131 detects that the wireless base station providing the highest power level to the communication device CD2 is indicated by the communication information 220 is wireless base station 132 assigned the physical cell identity information PCI 200.

In such an instance, the wireless base station 131 selects the unique identity PCI200 of the wireless base station 132 in which to transmit a wireless signal 162-C from the wireless base station 131 to the communication device CD2, encouraging the handoff of the communication device CD2 and wireless communication link 127-1 from the wireless base station 131 to the wireless base station 132.

Figure 5:
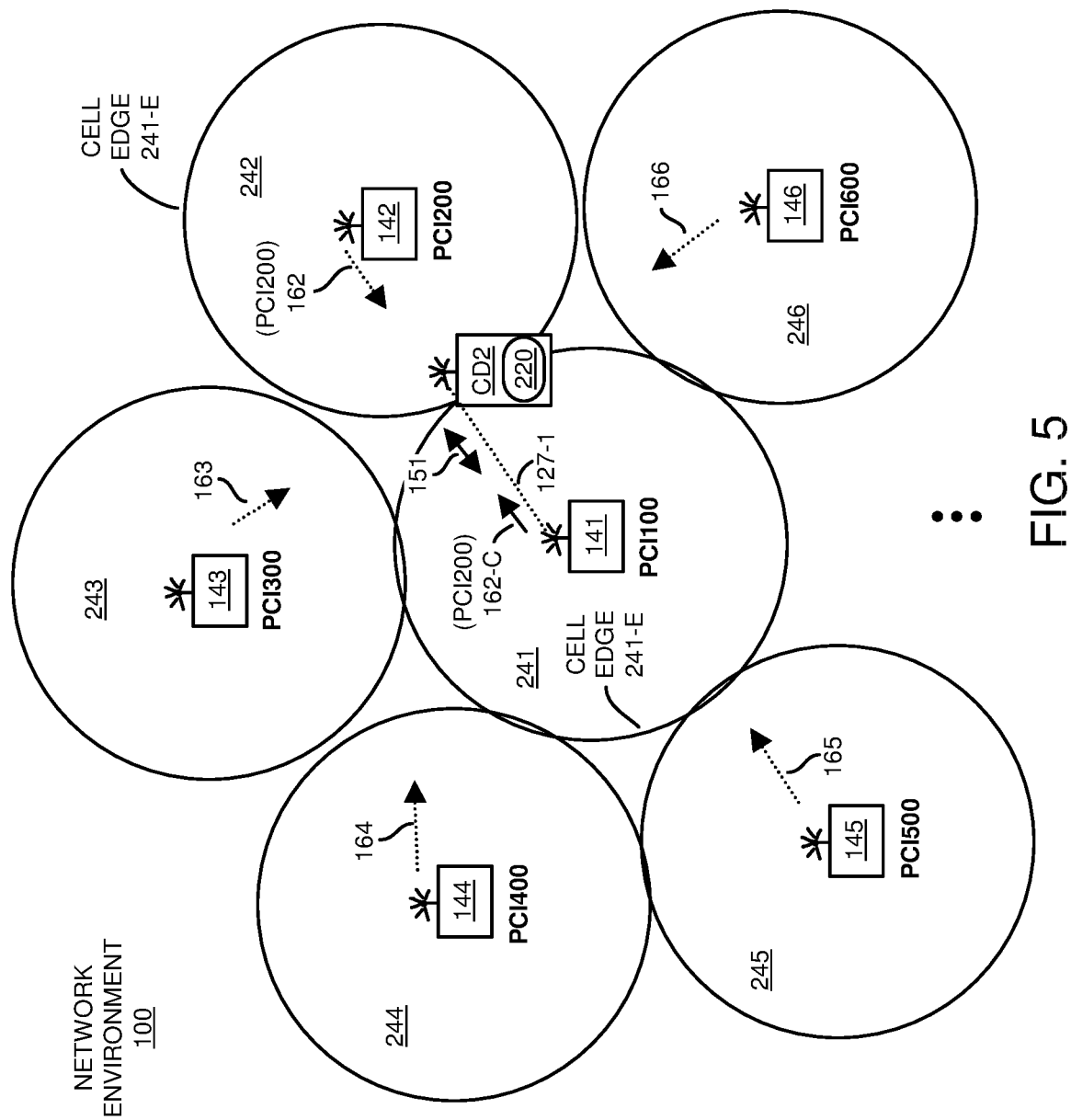
FIG. 5 is an example diagram illustrating replication and transmission of physical cell identity information from a wireless base station to initiate a handoff according to embodiments herein.

FIG. 5 is an example diagram illustrating replication and transmission of physical cell identity information from a wireless base station to initiate a handoff according to embodiments herein.

As shown in FIG. 5, in response to the wireless base station 131 detecting (from received communication information 220) that the power level at which the communication device CD2 receives the wireless communication from the second wireless base station 132 is greater than the power level at which the communication device CD2 receives wireless communications from the wireless base station 131 or other wireless base stations 131, 133, 134, 135, 136, etc., the wireless base station 131 selects the wireless base station 132 in which to attempt a respective handoff. In such an instance, the wireless base station 131 maps the highest power level value of 12 in the list of communication information 220 to the corresponding physical cell identity information PCI200. In other words, the wireless base station 132 is detected as a better candidate than the wireless base station 131 or wireless base stations 133, 134, 135, etc., in which to handoff the communication device CD2.

As previously discussed, in one embodiment, the wireless base station 131 transmits the wireless signal 162-C to initiate the handoff of the communication device CD2 from the wireless base station 131 to the wireless base station 132. More specifically, in one embodiment, in response to the wireless base station 131 detecting conditions such as one or more of: i) a quality of the wireless communication link 127-1 falls below a threshold level, ii) the communication device CD2 resides on the cell edge 241-E, iii) the wireless base station 131 would like to reduce its current load of communication devices to which it provides wireless connectivity to the remote network 190, etc., the wireless base station 131 transmits a respective wireless signal 162-C including the physical cell identity information PCI200 assigned to the wireless base station 132.

In one embodiment, the wireless base station 131 implements one or more instances of antenna hardware to transmit the wireless signal 162-C from the wireless base station 162 using a unique identity (PCI200) assigned to the wireless base station 132. The wireless signal 162-C communicated from the first wireless base station potentially replicates a wireless communication 162 transmitted by the wireless base station 132.

In still further example embodiments, each of the wireless base stations is synchronized to transmit the wireless signals 161, 162, 163, 164, etc., in the same or different assigned time slots of a respective wireless channel.

In one embodiment, in further example embodiments, the wireless base station 131 transmits the replica wireless signal 162-C in a same timeslot that the wireless base station 132 transmits the wireless signal 162. The communication device CD2 senses a high wireless signal strength of receiving the physical cell identity PCI200 (based on simultaneously receiving wireless signals 162 and 162-C). The reception of the physical cell identity PCI200 at the high signal strength prompts the communication device CD2 to establish a respective wireless communication link 127-2 between the communication device CD2 and the wireless base station 132. To complete the soft handoff, the wireless base station 131 and communication device CD2 then terminate wireless communication link 127-1.

In further example embodiments, the wireless base station 131 transmits the wireless signal 162-C(physical cell identity PCI200) or value PCI200 via two components-namely, (PSS) Primary Synchronization Signal and (SSS) Secondary Synchronization Signal transmitted from the wireless base station 131. The wireless base station 131 can be configured to transmit the signal PCI200 instead of its own cell identity PCI100. The mobile communication device CD2 (such as user equipment) receives the signals from transmitting wireless base station 131. After successful decode of PSS and SSS in the wireless signal 162-C, the communication device CD2 is then able to calculate the PCI200.

Figure 6:
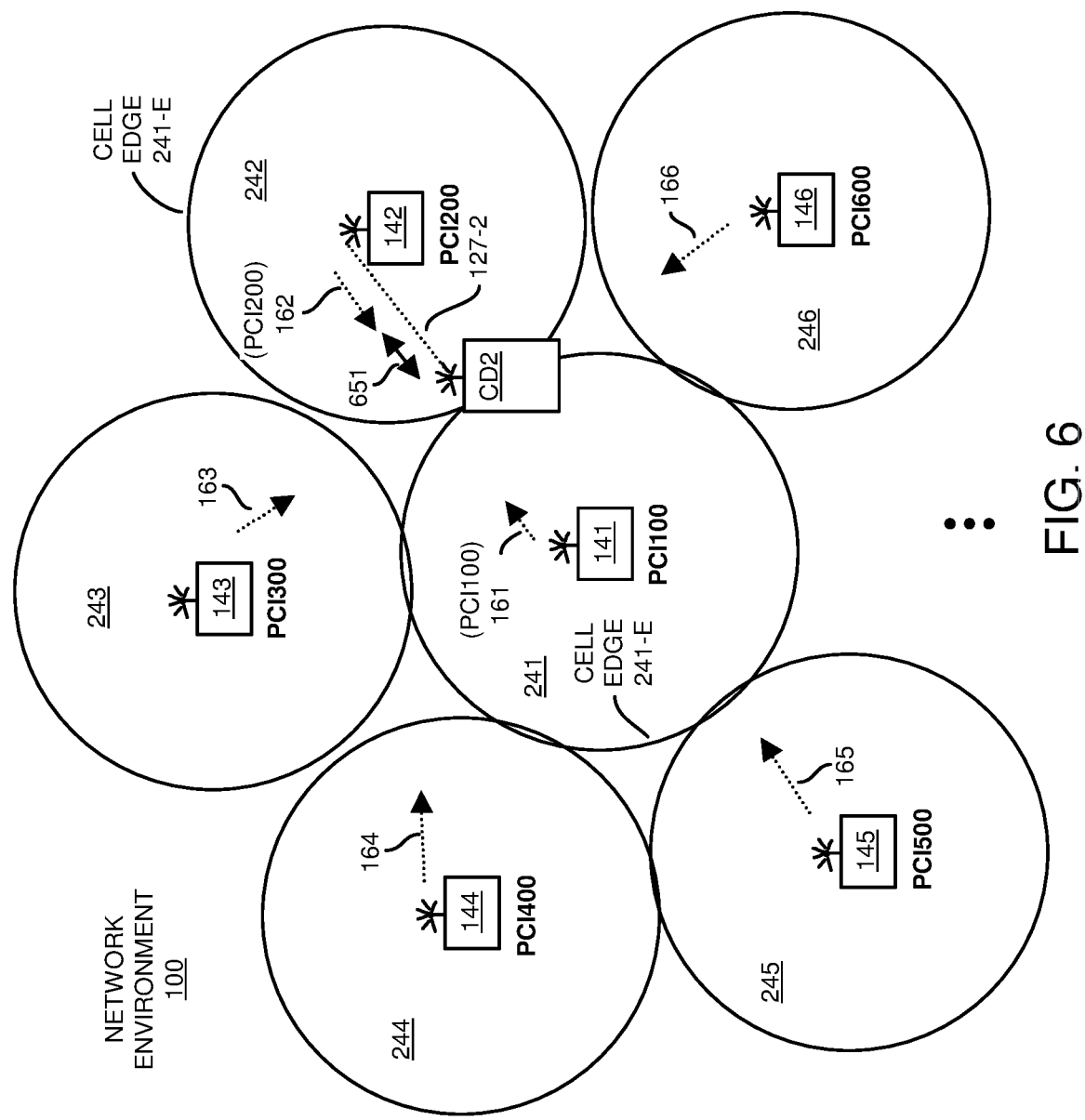
FIG. 6 is an example diagram illustrating completed handoff of a mobile communication device from a first wireless base station to a second wireless base station according to embodiments herein.

As further discussed in FIG. 6, the wireless communication link 127-2 provides wireless connectivity of the communication device CD2 to the remote network 190.

FIG. 6 is an example diagram illustrating handoff of a mobile communication device from a first wireless base station to a second wireless base station according to embodiments herein.

Subsequent to performing the respective handoff of the wireless communication link 127-1 and communication device CD2 from the wireless base station 131 to the wireless base station 132, the wireless base station 132 provides the communication device CD2 connectivity to the remote network 190 via wireless communication link 127-2. As shown, the wireless communication link 127-2 supports wireless communications 651 between the communication device CD2 and the wireless base station 132.

In a similar manner as previously discussed, the wireless base station 132 can be configured to transmit respective physical cell identity information of another wireless base station (such as any of wireless base station 131, 133, 134, 135, 136 etc., to initiate a handoff of the communication device CD2 and corresponding wireless communication link 127-2 to another wireless base station in the network environment 100.

Figure 7:
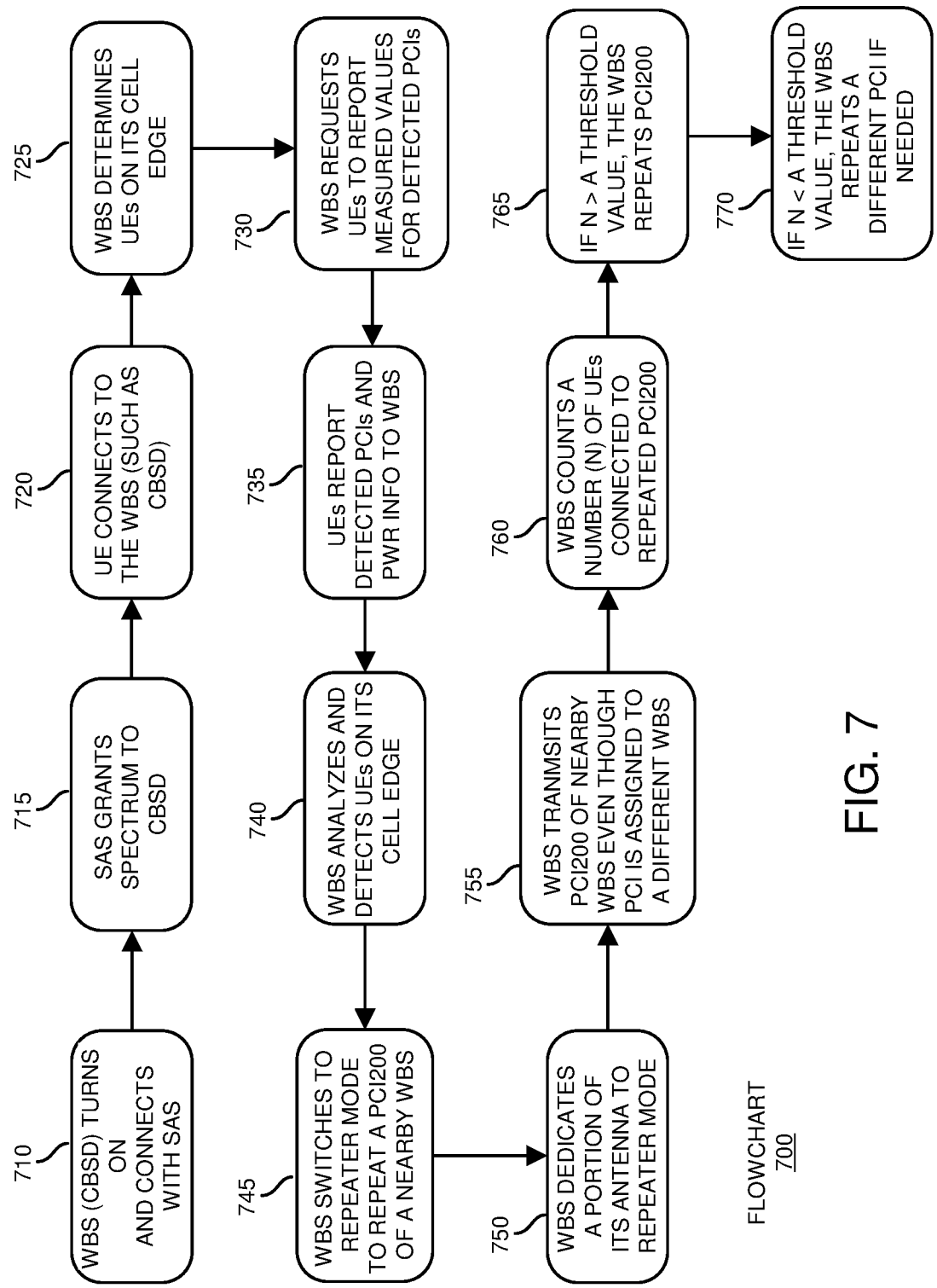
FIG. 7 is an example diagram illustrating operation of implementing cell identity replication and handoff of one or more mobile communication devices according to embodiments herein.

FIG. 7 is an example diagram illustrating operation of implementing cell identity replication and handoff of one or more mobile communication devices according to embodiments herein.

In processing operation 710, the wireless base station 131 and wireless base station 132 power ON and connect with a respective allocation management resource (such as spectrum access system) for allocation of one or more wireless channels.

In processing operation 715, the allocation management resource 140 grants spectrum (such as one or more wireless channels) to the first wireless base station 131 such as CBSD1.

In processing operation 720, the mobile communication device CD2 and other communication devices (such as user equipment) connect to the first wireless base station 131 and start sending data in a respective uplink direction to the first wireless base station 131 and receive data from the first wireless base station 132 in the downlink direction.

In processing operation 725, the first wireless base station 131 determines that one or more instances of the user equipment (communication device such as CD2 and other communication devices) reside on a cell edge of the wireless base station 131 based on received power headroom information (such as information specifying power levels at which the respective communication device CD2 receives wireless signals from other wireless stations in the network environment) reported by the UEs to the first wireless base station. In one embodiment, if powerheadroom=[0,N]; the respective UE is near an edge of the region of wireless coverage provided by the first wireless base station. Any suitable method can be used to determine whether the respective communication devices on the cell edge. For example, the power level of a received signal from the mobile communication device indicates that it resides on a cell edge. The mobile communication device can communicate its location to the wireless base station.

In processing operation 730, the first wireless base station 131 requests a report from any instances of the communication devices (user equipment) near an edge of the region of wireless coverage provided by the first wireless base station. In one embodiment, each of the mobile communication devices at the cell edge associated with the first wireless base station 131 report information such as PCIs (Physical Cell Identities) associated with other wireless base stations detected by the respective communication devices. In one embodiment, these are the PCIs of the other nearby wireless base stations (such as CBSDs) transmitting in the network environment. Such wireless base stations are candidate wireless base stations in which to potentially accept a handoff of the communication device from the wireless base station 131.

In processing operation 735, the communication devices report, to the wireless base station 131, the PCIs that they detect from other nearby wireless base stations transmitting their physical cell identities.

In processing operation 740, the first wireless base station 131 analyzes the reports such as communication information 220 to determine the communication devices on its cell edge. The wireless base station determines the PCIs that can be measured by UEs on a respective cell edge, but cannot be seen and measured by the non-cell edge UEs. These are the PCIs that can reach to the cell edge of the first wireless base station attempting to handoff the communication device; however, wireless power of these transmitted PCIs may not be of sufficient level to be detected by the first wireless base station. The power level of the transmitted PCIs may not be sufficiently strong to cause the communication device to initiate the handoff to any of those wireless base stations.

In processing operation 745, the wireless base station 131 uses one of the cell edge only PCIs (such as PCI200) in a repeater mode in which the first wireless base station 131 transmits a respective signal indicating the physical cell identity of wireless base station 132 another wireless base station detected by the user equipment.

In processing operation 750, the first wireless base station 131 enters a repeater mode as follows: i) the first wireless base station selects a physical cell identity of a wireless base station in communication with the user equipment on the edge of the region of wireless coverage provided by the first wireless base station, ii) the first wireless base station dedicates one or more of its antennas for repeater operation to transmit the selected physical cell identity PCI200, iii) the first wireless base station transmits the selected physical cell identity PCI200 in 360-degree direction (omni-directional transmitted wireless communications), the communication device CD2 perceives that the second wireless base station transmits the cell identity even though it is transmitted from the first wireless base station 131.

In processing operation 760, the first wireless base station counts the number of UEs that are handing off to the wireless base station assigned the selected physical cell identity PCI200. In one embodiment, these UEs (communication devices) are handing off from the CBSD as original owner of the PCI200.

In processing operation 765, if the number of mobile UEs getting connected to the repeated PCI is greater than a threshold level or threshold number 'N', then the first wireless base station 131 will keep transmitting the selected PCI. This may cause additional mobile communication devices to handoff from the wireless base station 131 to the wireless base station 132.

In processing operation 770, if the number of mobile UEs connecting to the repeated PCI is greater than a threshold level or threshold number 'N', then the first wireless base station 131 selects another physical cell identity (such as PCI300) to transmit. The first wireless base station 131 repeats this process as needed to handoff one or more communication devices to different wireless base stations in the network environment. In this manner, the first wireless base station 131 causes a handoff of one or more mobile communication devices from the first wireless base station 131 to the second wireless base station 132 via transmission of PCI200, the first wireless base station 131 causes a handoff of one or more mobile communication devices from the first wireless base station 131 to the third wireless base station 133 via transmission of PCI300, the first wireless base station 131 causes a handoff of one or more mobile communication devices from the first wireless base station 131 to the fourth wireless base station 134 via transmission of PCI400, and so on.

More specifically, the wireless base station 131 transmits the cell identity of a second wireless base station to cause a first set of one or more mobile communication devices to handoff respective wireless communication links from the first wireless base station 131 to the second wireless base station; the wireless base station 131 transmits the cell identity of a third second wireless base station to cause a second set of one or more mobile communication devices to handoff respective wireless communication links from the first wireless base station 131 to the third wireless base station; the wireless base station 131 transmits the cell identity of a fourth wireless base station to cause a third set of one or more mobile communication devices to handoff respective wireless communication links from the first wireless base station 131 to the fourth wireless base station; and so on.

Figure 8:
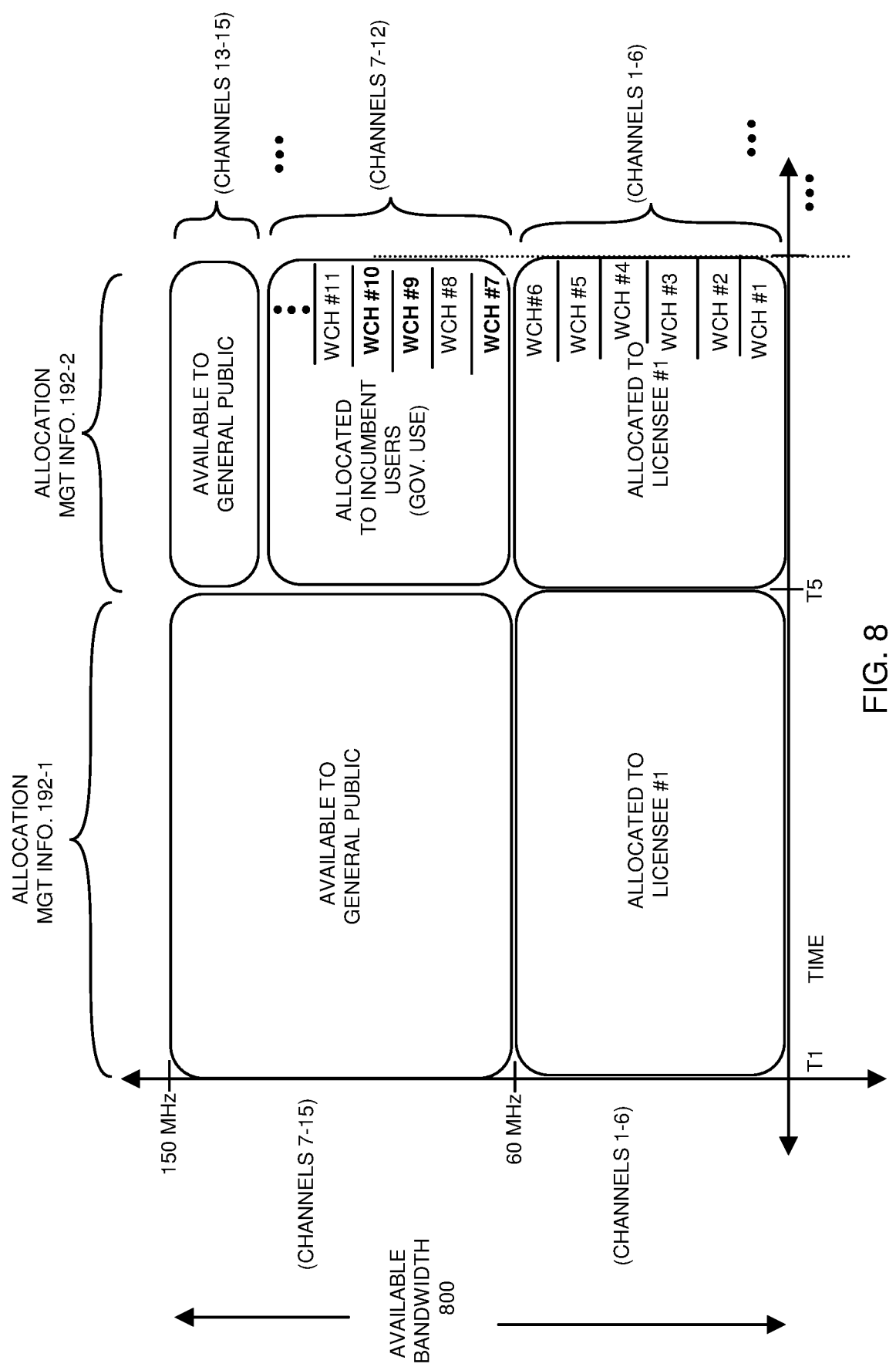
FIG. 8 is an example diagram illustrating a wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the allocation management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices. At or around time T5, the communication management resource 140 deallocates use of the wireless channels #7, #8, #9 and #10 from the wireless base station 131 in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

In this example embodiment as previously discussed, the allocation management resource 140 can be configured to allocate use of wireless channel WCH #7 to one or more wireless base stations (such as wireless base station 131, wireless base station 132, etc. In response to detecting a condition that a respective one or more incumbent entity uses the respective wireless channels, the allocation management resource 140 communicates with the wireless base stations to revoke use of such wireless channels. If available, the allocation management resource 140 allocates use of different wireless channels to the wireless base stations.

Figure 9:
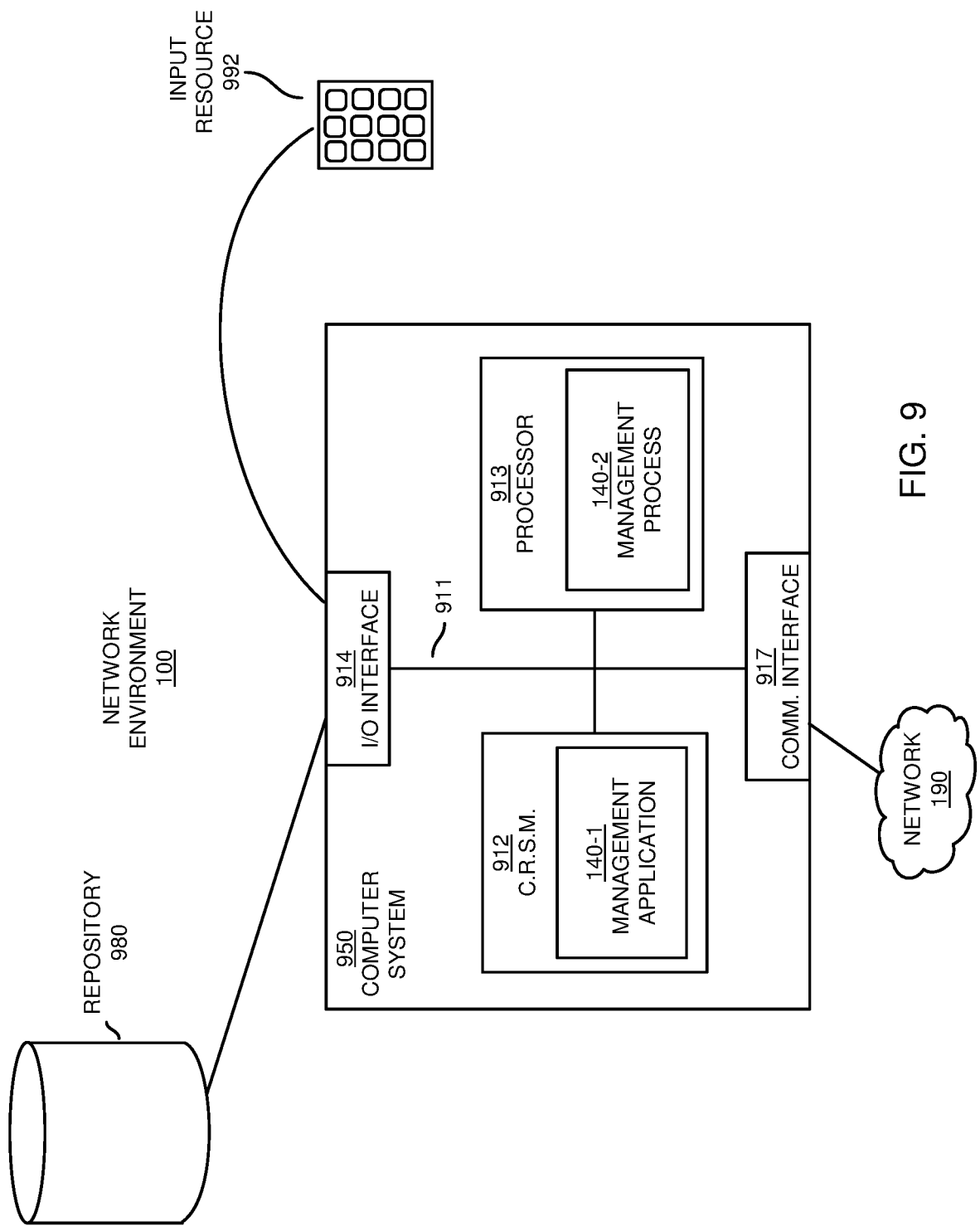
FIG. 9 is an example diagram illustrating example computer architecture operable to execute one or more operations according to embodiments herein.

FIG. 9 is an example block diagram of a computer system for implementing any of the operations as discussed herein according to embodiments herein.

Any of the resources (such as allocation management resource 140, wireless base station 131, communication management resource 141, wireless base station 132, communication management resource 142, etc.) as discussed herein can be configured to include a respective instantiation of computer processor hardware and corresponding executable instructions to carry out the different operations as discussed herein. For example, allocation management resource 140 can be configured to execute the management application 140-1 to execute operations associated with the communication management resource 140; wireless base station 131 can be configured to execute the management application 140-1 to execute operations associated with the multi-tier wireless base station 131, etc.

As shown, computer system 950 of the present example includes an interconnect 911 that couples computer readable storage media 912 such as a non-transitory type of media (i.e., any type of hardware storage medium) from which digital information is stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
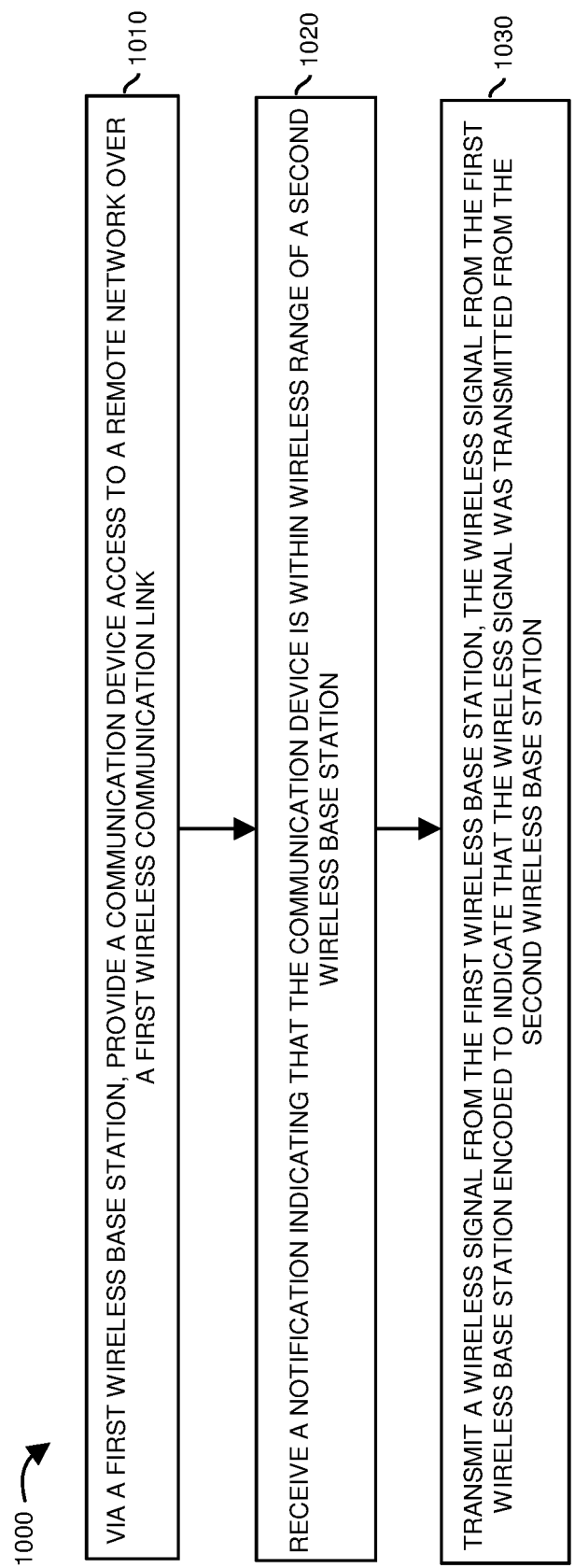
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the first wireless base station 131 and corresponding communication management resource 141 provides a communication device CD2 access to a remote network 190 over a first wireless communication link 127-1.

In processing operation 1020, the first wireless base station 131 and corresponding communication management resource 141 receive a notification indicating that the communication device CD2 is within wireless range of a second wireless base station 132. The second wireless base station 132 is therefore a candidate in which to receive a handoff of the communication device CD2 and corresponding wireless communication link 127-1 from the first wireless base station 131.

In processing operation 1030, the first wireless base station 131 and corresponding communication management resource 141 transmit a wireless signal 162-C(copy or repeat) encoded to indicate that the wireless signal 162-C was transmitted from the second wireless base station 132. In one embodiment, the wireless signal 162-C prompts the communication device CD2 to handoff connectivity (such as wireless communication link 127-1) from the first wireless base station 131 to the second wireless base station 132. The new wireless communication link 127-2 provides the communication device CD2 connectivity to the remote network 190.

Note again that techniques herein are well suited to support handoff management of one or more wireless stations in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:
1. A method comprising:
via a first wireless base station:
providing a communication device access to a remote network over a first wireless communication link;
receiving a notification indicating that the communication device is within wireless range of a second wireless base station, the notification generated based on the communication device detecting a wireless communication transmitted from the second wireless base station; and in response to receiving the notification, transmitting a wireless signal from the first wireless base station, the wireless signal transmitted from the first wireless base station encoded to indicate that the wireless signal was transmitted from the second wireless base station;

wherein the transmitted wireless signal from the first wireless base station causes the communication device to handoff from the first wireless base station to the second wireless base station.

2. The method as in claim 1 further comprising:
transmitting the wireless signal from the first wireless base station in response to detecting that a quality of the first wireless communication link conveying wireless messages between the first wireless base station and the communication device is below a threshold level.

3. The method as in claim 1 further comprising:
receiving the notification from the communication device, the communication device generating the notification in response to the communication device detecting that the second wireless base station is within wireless range of the communication device.

4. The method as in claim 3, wherein the first wireless base station resides outside the wireless range of the second wireless base station.

5. The method as in claim 4, wherein reception of the wireless communication by the communication device is not sufficiently strong enough to cause the communication device to initiate a handoff of the communication device from the first wireless base station to the second wireless base station.

6. The method as in claim 1, wherein the wireless signal is transmitted from the first wireless base station using a unique identity assigned to the second wireless base station.

7. The method as in claim 6 further comprising:
at the first wireless base station, receiving notification of the unique identity assigned to the second wireless base station based on a communication received from the communication device.

8. The method as in claim 1 further comprising:
at the first wireless base station, receiving feedback from the communication device, the feedback indicating a unique identity of the second wireless base station and a power level at which the communication device wirelessly receives a first communication from the second wireless base station.

9. The method as in claim 8, wherein the feedback received from the communication device further includes a unique identity of a third wireless base station and a power level at which the communication device wirelessly receives a second communication from the third wireless base station.

10. The method as in claim 9 further comprising:
in response to detecting that the power level at which the communication device receives the first communication from the second wireless base station is greater than the power level at which the communication device receives the second communication from the third wireless base station, including the unique identity of the second wireless base station in the wireless signal.

11. The method as in claim 1, wherein the wireless signal from the first wireless base station is a replication of the wireless communication transmitted by the second wireless base station.

12. The method as in claim 11, wherein the wireless communication transmitted by the second wireless base station includes an identity value assigned to the second wireless base station, the wireless communication indicating presence of the second wireless base station in a network environment; and wherein the wireless signal includes the identity value assigned to the second wireless base station, the wireless signal repeating the indicating of the presence of the second wireless base station in the network environment.

13. The method as in claim 1 further comprising:
receiving the notification at the first wireless base station in response to the first wireless base station transmitting a request to the communication device.

14. The method as in claim 13, wherein the request transmitted from the first wireless base station to the communication device notifies the communication device to monitor for presence of wireless base stations in wireless range of the communication device.

15. The method as in claim 14, wherein the request is transmitted from the wireless base station to the communication device in response to detecting that a power level of the first wireless base station receiving wireless messages from the communication device are below a threshold level.

16. The method as in claim 1, wherein transmitting the wireless signal from the first wireless base station includes operating the first wireless base station in a repeater mode in which the wireless signal transmitted from the first wireless base station is encoded to indicate an identity of the second wireless base station, the wireless signal being a copy of the wireless communication transmitted from the second wireless base station.

17. The method as in claim 1, wherein the first wireless base station generates the wireless signal to indicate an identity of the second wireless base station in response to detecting that the wireless signal is not detectable by a wireless communication device not located on a respective cell edge of the first wireless base station.

18. The method as in claim 1, wherein the wireless communication is a second wireless communication;
wherein the notification is feedback received by the first wireless base station from the communication device, the feedback including:
i) first information indicating a first signal strength of the communication device receiving a first wireless communication transmitted from the first wireless base station;
ii) second information indicating a second signal strength of the communication device receiving the second wireless communication transmitted from the second wireless base station; and
iii) third information indicating a third signal strength of the communication device receiving a third wireless communication transmitted from a third wireless base station.

19. The method as in claim 18, wherein the first information further indicates a first identifier value indicating an identity of the first wireless base station;
wherein the second information further indicates a second identifier value indicating an identity of the second wireless base station; and
wherein the third information indicates a third identifier value indicating an identity of the third wireless base station.

20. The method as in claim 19 further comprising:
based on analyzing the feedback received from the communication device, detecting that the second signal strength is a highest received signal strength amongst a combination of the first signal strength, the second signal strength, and the third signal strength; and
selecting the second wireless base station in response to detecting that the second signal strength is the highest received signal strength.

21. The method as in claim 20, wherein the wireless signal is transmitted from the first wireless base station while the first wireless base station operates in a repeater mode of repeating transmission of the second wireless communication from the first wireless base station.

22. A system comprising:
communication management hardware associated with a first wireless base station, the communication management hardware operative to:
provide a communication device access to a remote network over a first wireless communication link;
receive a notification indicating that the communication device is within wireless range of a second wireless base station;
operate the first wireless base station in a repeater mode in response to detecting that the communication device is within the wireless range of the second wireless base station; and
while in the repeater mode, transmit a wireless signal from the first wireless base station, the transmitted wireless signal from the first wireless base station encoded to indicate that the wireless signal was transmitted from the second wireless base station;
wherein the transmitted wireless signal from the first wireless base station causes the communication device to handoff from the first wireless base station to the second wireless base station.

23. The system as in claim 22, wherein the communication management hardware is further operative to:
transmit the wireless signal in response to detecting that a quality of the first wireless communication link is below a threshold level.

24. The system as in claim 22, wherein the communication management hardware is further operative to:
receive the notification from the communication device, the communication device generating the notification in response to detecting that the second wireless base station is within wireless range of the communication device.

25. The system as in claim 22, wherein the communication management hardware is further operative to:
receive feedback from the communication device, the feedback indicating a unique identity of the second wireless base station and a power level at which the communication device receives a communication from the second wireless base station.

26. The system as in claim 25, wherein the feedback received from the communication device further includes a unique identity of a third wireless base station and a power level at which the communication device receives a communication from the third wireless base station.

27. The system as in claim 26, wherein the communication management hardware is further operative to:
select the unique identity of the second wireless base station in which to transmit the wireless signal from the first wireless base station in response to detecting that the power level at which the communication device receives the communication from the second wireless base station is greater than the power level at which the communication device receives the communication from the first wireless base station.

28. The system as in claim 22, wherein the wireless signal transmitted from the first wireless base station is a copy of a wireless communication transmitted by the second wireless base station, the wireless communication indicating an identity of the second wireless base station.

29. Computer-readable storage hardware having instructions stored thereon, the instructions, when carried out by computer processor hardware associated with a first wireless base station, cause the computer processor hardware to:
via the first wireless base station, provide a communication device access to a remote network over a first wireless communication link;
receive a notification indicating that the communication device is within wireless range of a second wireless base station, the notification generated based on the communication device detecting a wireless communication transmitted from the second wireless base station;
in response to receiving the notification, transmit a wireless signal from the first wireless base station, the wireless signal transmitted from the first wireless base station encoded to indicate that the wireless signal was transmitted from the second wireless base station; and
wherein the transmitted wireless signal from the first wireless base station causes the communication device to handoff from the first wireless base station to the second wireless base station.

* * * * *